(12) United States Patent
Skinner

(10) Patent No.: US 8,036,362 B1
(45) Date of Patent: Oct. 11, 2011

(54) COMMUNICATION SYSTEM AND CALL FORWARDING MANAGEMENT

(75) Inventor: John C. Skinner, Franklin, MA (US)

(73) Assignee: RNK Inc., Dedham, MA (US)

( * ) Notice: Subject to any disclaimer, the term of this patent is extended or adjusted under 35 U.S.C. 154(b) by 1213 days.

(21) Appl. No.: 11/725,148

(22) Filed: Mar. 16, 2007

Related U.S. Application Data

(60) Provisional application No. 60/783,573, filed on Mar. 17, 2006.

(51) Int. Cl.
H04M 3/42 (2006.01)

(52) U.S. Cl. ......... 379/211.02; 379/211.01; 379/221.01; 379/221.14; 379/272; 379/273

(58) Field of Classification Search ............. 379/211.01, 379/211.02, 211.03, 221.01; 370/356
See application file for complete search history.

(56) References Cited

U.S. PATENT DOCUMENTS

| | | | |
|---|---|---|---|
| 5,276,731 A | 1/1994 | Arbel et al. | |
| 5,422,936 A | 6/1995 | Atwell | |
| 5,687,220 A | 11/1997 | Finnigan | |
| 5,909,483 A | 6/1999 | Weare et al. | |
| 6,173,043 B1 | 1/2001 | Finnigan | |
| 6,205,135 B1 * | 3/2001 | Chinni et al. | 370/356 |
| 6,697,459 B2 | 2/2004 | Finnigan | |
| 6,771,761 B1 * | 8/2004 | LaPierre | 379/211.02 |
| 6,891,942 B1 * | 5/2005 | Porter et al. | 379/211.02 |
| 7,194,080 B2 * | 3/2007 | Worsham et al. | 379/211.03 |
| 7,649,987 B1 * | 1/2010 | Contractor | 379/221.02 |
| 2004/0208305 A1 * | 10/2004 | Gross et al. | 379/211.01 |
| 2004/0247107 A1 * | 12/2004 | Chen et al. | 379/219 |
| 2005/0152527 A1 * | 7/2005 | Kent et al. | 379/211.02 |
| 2005/0163301 A1 * | 7/2005 | Didcock | 379/211.01 |
| 2005/0195954 A1 * | 9/2005 | Klein et al. | 379/201.04 |
| 2005/0195957 A1 * | 9/2005 | Gibson | 379/211.02 |
| 2005/0201533 A1 * | 9/2005 | Emam et al. | 379/88.19 |
| 2006/0227957 A1 * | 10/2006 | Dolan et al. | 379/212.01 |

* cited by examiner

Primary Examiner — Curtis Kuntz
Assistant Examiner — Joseph J Nguyen
(74) Attorney, Agent, or Firm — Chapin IP Law, LLC

(57) ABSTRACT

A call management system enables each of multiple prospective callers to specify how to forward (e.g., direct or redirect) future calls to one or more target phone devices or users. For example, each of multiple persons provide call forwarding configuration information to the call management system. Upon initiation of a call by a user, the call management system intercepts and forwards a user's call in accordance with call forwarding configuration information previously provided by the user.

22 Claims, 10 Drawing Sheets

CONTACT INFO FOR USER NAME: JIM SMITH

CALLER PHONE IDENTIFIER INFO FOR JIM SMITH: (345)266-8890 (LAND-LINE), (617)830-2350 (CELL), VOIP NUMBER 3436567

| CONTACT NAME | ZIP CODE | FIRST CALL FWD OPTION | TYPE | SECOND CALL FWD OPTION | TYPE | ••• | EMAIL | LINK STATUS | FIND? |
|---|---|---|---|---|---|---|---|---|---|
| JOHN DOE | 02068 | (541)235-6578 | CELL | (675)234-9833 | LAND | ... | JDOE@YAH.COM | ACTIVE | ☑ |
| JOSEPH COOK | 02062 | (541)237-3434 | LAND | (233)435-1455 | CELL | ... | JC@RCN.COM | INACTIVE | ☐ |
| TONY Q. | 99123 | (213)443-2876 | CELL | (617)754-1648 | CELL | ... | TFQ@VERIZON.NET | INACTIVE | ☑ |
| ... | ... | ... | ... | ... | ... | | ... | ... | ... |

GUI 420

CALL FORWARDING PROFILE INFO 482

FIG. 4

COMMUNICATION SYSTEM AND CALL FORWARDING MANAGEMENT

RELATED APPLICATION

This application is related to and claims the benefit of earlier filed U.S. Provisional Patent Application Ser. No. 60/783,573 entitled "METHOD AND APPARATUS FOR USE IN COMMUNICATIONS," filed on Mar. 17, 2006, the entire teachings of which are incorporated herein by this reference.

BACKGROUND

According to conventional techniques, people have the ability to communicate with each other via a variety of communication options. For example, consumers can communicate via use of the traditional PSTN (Public Switched Telephone Network) resources such as a land-line or "wire line" phone. Such technology has been around form any years. Over time, PSTN technology has been augmented with the addition of cellular technology and VOIP (Voice Over Internet Protocol) capabilities. Accordingly, people now have the ability to communicate over wireless links as well as over the Internet. Typically, a single user can be reached via a number of different ways such as via a cell phone, a VOIP phone, a landline phone, etc.

To some degree, phone subscribers have the ability to configure how they receive telephone calls. For example, persons receiving calls have the ability to specify how to terminate incoming communications to a variety of their personal communication devices such as a land-line phones, cellular phones, etc.

SUMMARY

Techniques discussed herein deviate with respect to conventional applications such as those discussed above as well as other techniques known in the prior art. Certain embodiments herein overcome deficiencies associated with the above-mentioned techniques and/or other deficiencies in the prior art not mentioned above.

For example, embodiments herein are generally directed towards call management systems, methods, etc. that enable a respective caller to specify how to forward (e.g., direct or redirect) calls to one or more target phone devices or users. In one embodiment, each of multiple persons provide call forwarding configuration information to a call management system. Upon initiation of a call by a user, the call management system forwards a user's call in accordance with call forwarding configuration information previously provided by the user.

According to more specific embodiments, prospective callers can select criteria to route a call request over a circuit-switched (e.g., PSTn, cellular network, etc.) or packet-switched network (e.g., the Internet) by supplying information (e.g., input) to the call management system. The supplied information can include contact information such as a name of subscribers and a set of different phone numbers for reaching each subscriber. In addition to supplying the contact information, one or more prospective callers can select options to forward a user's calls depending on the called party. For example, when the caller subsequently initiates a call through the call management system that stores the contact information, the call management system forwards the call as previously specified by the caller.

Call forwarding can include a process of first identifying the origin of a call (or caller) and thereafter retrieving configuration information associated with the caller in order to determine how to forward a respective call. For example, a call management system can identify that a registered user is currently attempting to reach a specified target phone user. Based on the identity of the registered user, the call management system retrieves call forwarding information previously provided by the registered user. If the retrieved configuration information specifies how to forward a call to the subscriber that the caller is currently attempting to reach, then the call management system processes (e.g., forwards) the call in accordance with the retrieved call forwarding information. Alternatively, if the retrieved configuration information does not specify any call forwarding options for the callee (e.g., called party) to which the call is directed, then the call management system can forward the call as originally specified by the caller. For example, if the caller dials a unique phone number to reach the callee and there are no call forwarding options for such a target user, the call management system attempts to connect the caller to the callee via the provided phone number without applying any call forwarding options.

The retrieved call forwarding information as provided by a prospective caller can specify one or more different call forwarding options in which to create a call connection with a target subscriber. For example, a group of call forwarding options for a target phone user can specify multiple possible forwarding options (e.g., one or more phone numbers) and a corresponding order to implement the call forwarding options to reach the target phone user. Thus, based on a request to establish a call connection with the target user, the call management system can initiate a first attempt to establish the call connection between the caller and the target user based on a first call forwarding option (e.g., first forwarding phone number). In response to a failure to reach the target user via the first call forwarding option, the call management system can be configured to initiate a second attempt to establish the call connection between the caller and the target user based on a second call forwarding option (e.g., via a second phone number), and so on.

Accordingly, one embodiment herein includes a call management system configured to receive input from a prospective caller that specifies a set of rules (e.g., an order) for applying multiple different call forwarding options for reaching a target user (e.g., a person the prospective caller wants to call at a subsequent time using the call management system).

Note that the call management system according to embodiments herein can include a configuration of one or more computerized devices, interactive voice response systems, web page servers, phone equipment, handheld or laptop computers, etc. to carry out and/or support any or all of the method operations disclosed herein. In other words, any of one or more computerized devices or processors can be programmed and/or configured to operate as explained herein to carry out different embodiments of the invention.

In addition to configured hardware, yet other embodiments herein include software programs and/or methods that perform (or facilitate performing) the steps and operations summarized above and disclosed in detail below. One such embodiment comprises a computer program product that has a computer-readable medium including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer readable medium having instructions stored thereon for supporting operations such as connecting callers as described herein. The instructions, when carried out by a processor of a respective computer device, cause the processor system to: i) receive input from a prospective caller specifying an order for applying multiple different call forwarding options for reaching a target user; ii) receive a request from the prospective caller to establish a call connection between the prospective caller and the target user; and iii) in response to receiving the request, as specified by the order, utilizing at least one of the multiple different call forwarding options to establish the call connection. The numbering of the steps has been added for clarity sake, these steps need not be performed in any particular order.

Other embodiments of the present disclosure include software programs to perform any of the method embodiment steps and operations summarized above and disclosed in detail below.

Also, it is to be understood that the system, method and apparatus herein can be embodied strictly as a software program, as a hybrid of software and hardware, or as hardware alone such as within a processor, or within an operating system or a within a software application. Example embodiments of the invention may be implemented within products and/or software applications such as those manufactured by RNK Communications of Dedham, Mass.

As discussed above, techniques herein are well suited for use in call management systems enabling phone connections. However, it should be noted that embodiments herein are not limited to use in such applications and that the techniques discussed herein are well suited for other applications as well. Note that each of the different features, techniques, configurations, etc. discussed herein can be executed independently or in combination. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below. Although not exhaustive, the claims section also provides different perspectives of the invention based on matter recited in the specification.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

FIG. 4 is a diagram of a screenshot illustrating different types of call forwarding information provided by a prospective caller according to embodiments herein.

DETAILED DESCRIPTION

According to embodiments herein, a call management system enables each of multiple prospective callers to specify how to forward (e.g., direct or redirect) future calls to one or more target phone devices or users. For example, each of multiple persons provide call forwarding configuration information to the call management system. Upon initiation of a call by a user, the call management system intercepts and forwards a user's call in accordance with call forwarding configuration information previously provided by the user.

Figure 1:
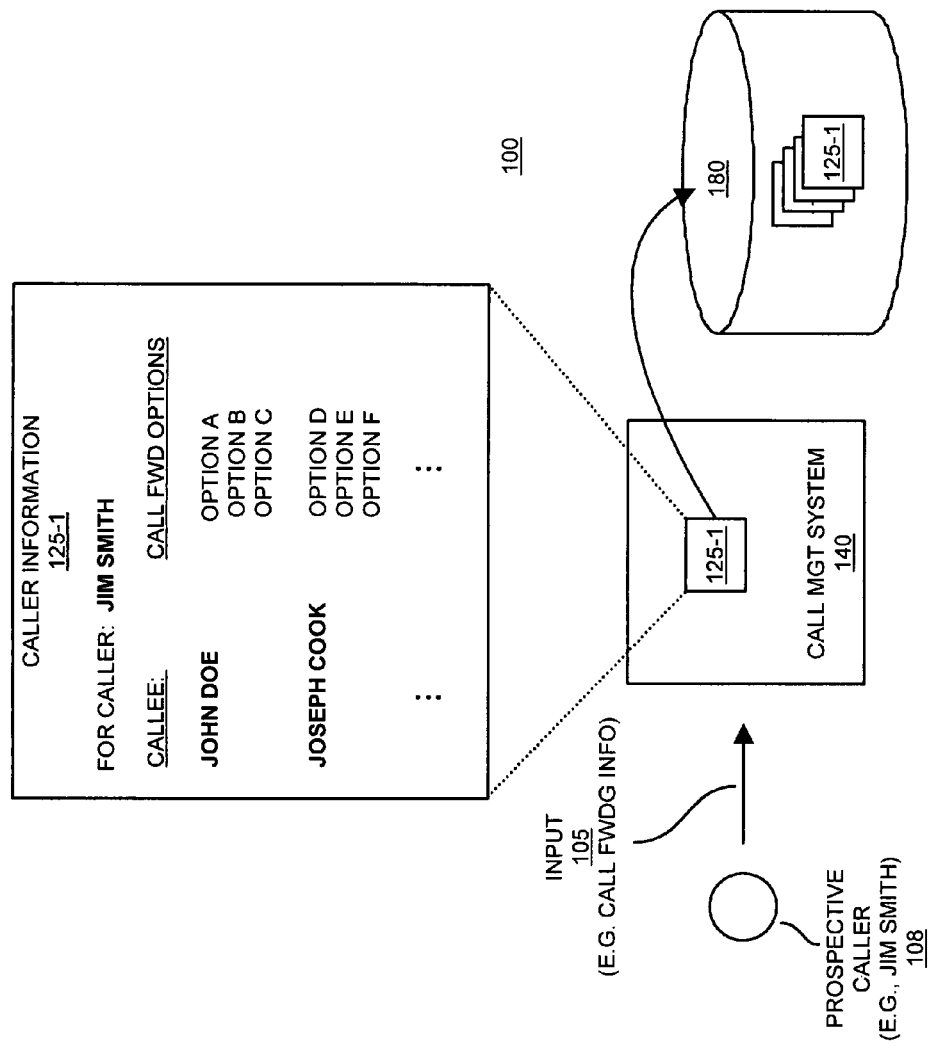
FIG. 1 is a diagram of an example communication system and maintenance of call forwarding information according to embodiments herein.

Now, more specifically, FIG. 1 is a diagram of a communication system 100 supporting call management according to embodiments herein. As shown, communication system 100 includes a prospective caller 108 (e.g., Jim Smith), call management system 140, and repository 180.

During operation, the call management system 140 receives input 105 from prospective caller 108 specifying one or more callees (e.g., persons or phone numbers that the prospective caller can call) and corresponding call forwarding options for reaching the callees. Based on the input 105, the call management system 140 produces caller information 125-1 (e.g., a user's profile of call forwarding options) specifying different call forwarding options for each of one or more potential callees as specified by the prospective caller 108.

In the present example, the prospective caller 108 provides first user contact information (e.g., John Doe) and multiple call forwarding options (e.g., option A, B, and C) that can be used to reach John Doe, second user contact information (e.g., Joseph Cook) and multiple call forwarding options to that can be used to reach Joseph Cook, and so on. Call management system 140 stores this caller information 125-1 (e.g., call forwarding information associated with Jim Smith) in repository 180 for later retrieval.

Figure 2:
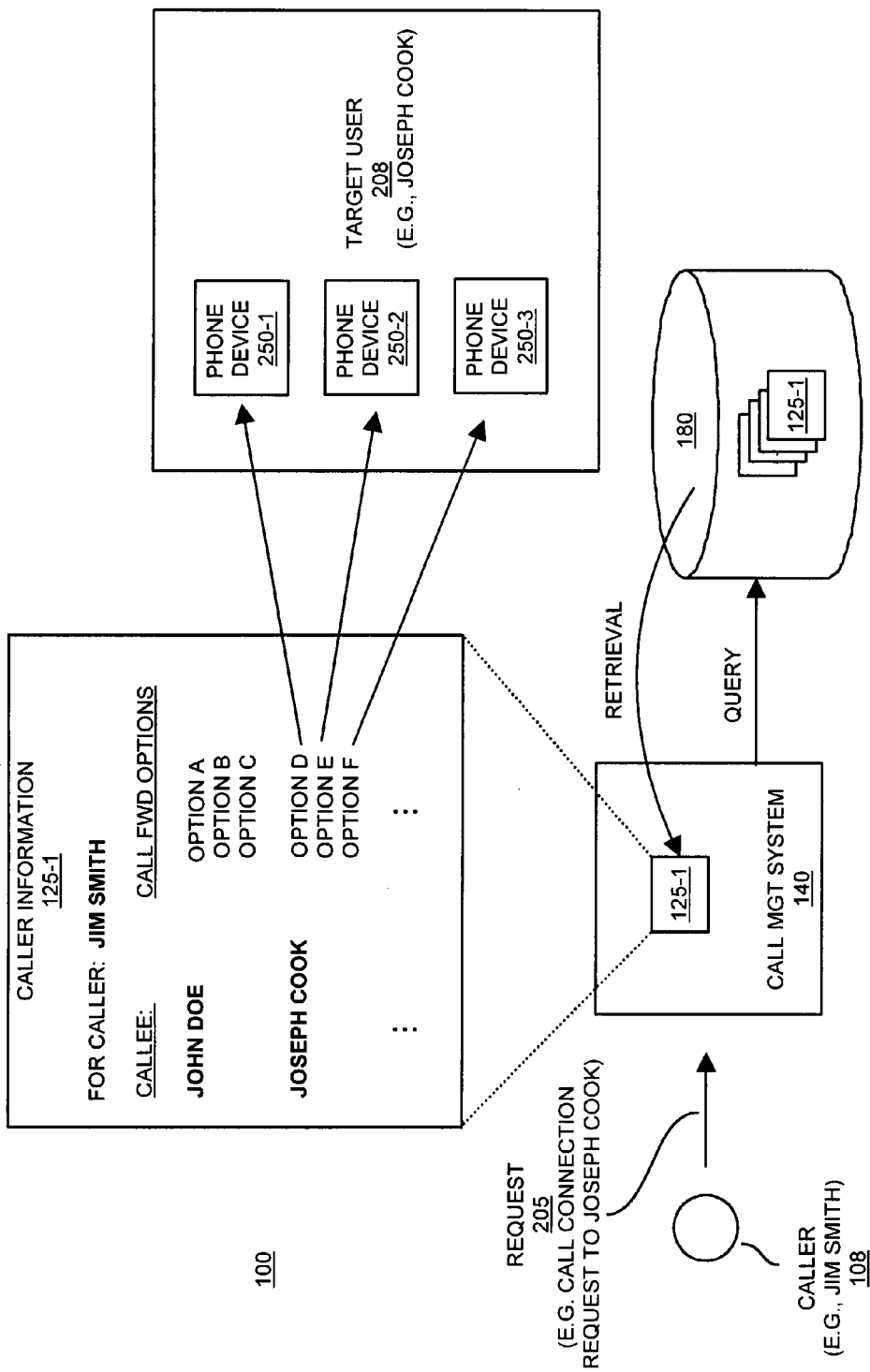
FIG. 2 is a diagram of an example communication system and use of call forwarding information according to embodiments herein.

FIG. 2 is a diagram illustrating an example use of the caller information 125 according to embodiments herein. As shown, via generation of request 205, caller 108 (Jim Smith) initiates a call connection to a target user 208 such as Joseph Cook.

Initially, the call management system 140 identifies whether repository 180 has any stored caller information 125 associated with the caller 108 initiating the request 205. If there is no caller information 125 in repository 180 associated with a present caller, then the call management system 140 attempts to establish a call connection with the user at the target number originally dialed by the caller 108 according to conventional methods.

In this example, however, the call management system 140 retrieves caller information 125-1 submitted by the caller 108 during previous communication session as discussed above with respect to FIG. 1. In other words, the call management system 140 initiates retrieval of caller information 125 for purposes of forwarding the received call.

After retrieving the caller information 125-1 associated with the caller 108, the call management system 140 analyzes the caller information 125-1 to identify whether the caller 108 has previously specified how to forward calls to the specified callee or target caller 208 (i.e., Joseph Cook) associated with the incoming request 205.

In the context of the present example, the call management system 140 identifies that the request 205 specifies an entry (e.g., Joseph Cook) associated with caller information 125-1. For example, the caller information 125-1 indicates that caller 108 previously specified that subsequent calls to Joseph Cook should be forward according to options D, E, and F.

Each of options D, E, and F can specify a different phone device 250 on which to reach target user 208. For example, option D (e.g., a first phone number) can specify a phone number associated with phone device 250-1 on which to establish a call connection between the caller 108 and the target user 208; option E (e.g., a second phone number) can specify a phone number associated with phone device 250-2 on which to establish a call connection between the caller 108 and the target user 208; option F (e.g., a third phone number) can specify a phone number associated with phone device 250-3 on which to establish a call connection between the caller 108 and the target user 208, and so on.

In accordance with the different options D, E, and F, the call management system 140 can attempt to create the call connection between the caller 108 and the target user 208 in the order as specified. For example, the call management system 140 can attempt to establish a connection with phone device 250-1 via use of call forwarding option D (e.g., attempting a call connection with the target via dialing of a first phone number). If this attempt fails, the call management system 140 can attempt establishment of a connection with the phone device 250-2 via call forwarding option E (e.g., attempting a call connection with a target via dialing of a second phone number). If this attempt fails, the call management system 140 can attempt establishment of a connection with the phone device 250-3 via call forwarding options F (e.g., attempting a call connection with the target via dialing of a third phone number), and so on until the call management system 140 is able to connect the caller 108 with the target user 208 or the call management system 140 exhausts all call forwarding options. A failed attempt can include receiving a busy signal, reaching the target user's voice mail, no answer by the target user, etc.

Note that the above example described a scenario in which the caller 108 attempts to reach the target user such as Joseph Cook. Note that if the caller 108 attempted to reach John Doe instead, the call management system 140 would use call forwarding options A, B, and C to reach John Doe.

Note that embodiments herein include a number of ways to implement the different call forwarding options. For example, in one embodiment, upon receipt of request 205 to reach a target user 208, the call management system 140 attempts to reach the target user via initiation of simultaneous calls to the target user via each of one or more different forwarding options rather than sequentially try each of the different call forwarding options. If the call management system 140 detects that the target user 208 answers one of the phones during the attempts, the call management system connects the caller 108 to the phone device 250 answered by the target user. Thus, the call management system 140 can be configured to initiate a call connection with a target user 208 via a parallel application of the call forwarding options. In such an embodiment, the caller 108 does not needlessly wait for a first call forwarding option to fail before trying another call forwarding option as specified by the prospective caller 108 prior to maintaining the call.

As previously discussed, in alternative embodiments, the call management system 140 can be configured to initiate successive or sequential attempts to reach a target. Thus, the call management system 140 can be configured to initiate a call connection with a target user 208 via a serial application of the call forwarding options.

In addition to an order in which to apply the call forwarding options, the prospective caller 108 also can specify a duration of time that the call management system 140 should attempt to reach the target party for a given call forwarding option before abandoning a current call attempt in favor of trying a next call forwarding option. Accordingly, the user 108 can limit the duration of each successive attempt (e.g., call forwarding option) to reach the target user 208.

Figure 3:
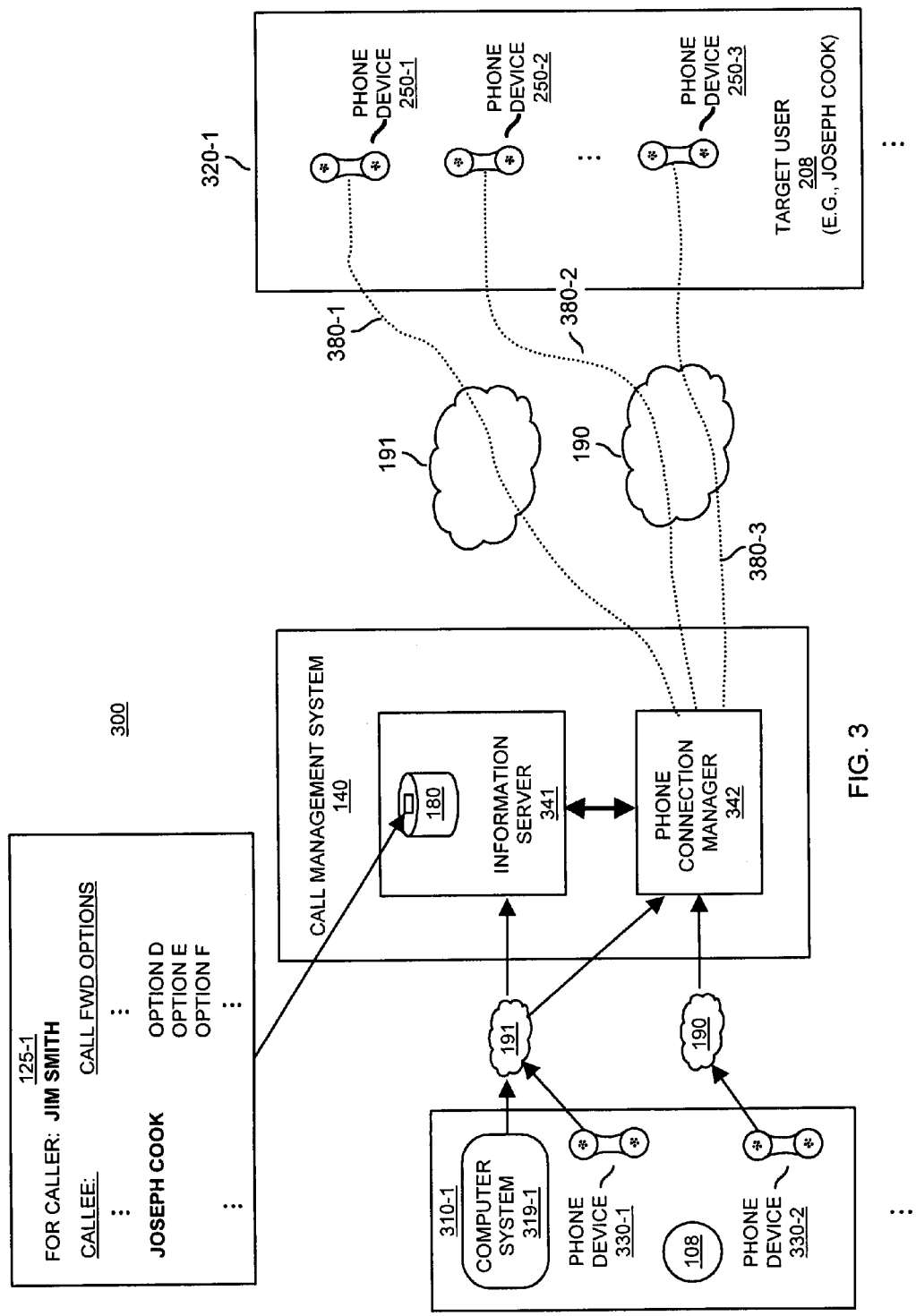
FIG. 3 is a diagram illustrating example use of a call management system according to embodiments herein.

Note that the functionality described herein can be implemented in a number of different environments. For example, as shown in FIG. 3, the call management system can be implemented in a phone service provider network. In addition to such an embodiment, the functionality as discussed herein can be implemented in a user's phone device such as a cellular phone, land-line phone, VOIP phone, etc. Accordingly, a user can program his/her phone device to implement a number of different call forwarding options to reach a target user.

FIG. 3 is a diagram of a communication system 300 according to embodiments herein. As shown, communication system 300 includes user domain 310-1, network 190 (e.g., a local area network, wide area network, the Internet, etc.), network 191 (e.g., cellular phone network, PSTN, etc.), call management system 140, and target user domain 320-1. User domain 330-1 includes user 108 that operates phone device 330-1, phone device 330-2, computer system 319-1, etc. User domain 320-1 includes target user 208 that operates phone devices 250 and other possible equipment such as a computer system, etc.

Call management system 140 includes information server 341 and phone connection manager 342. Information server 341 enables users to access, view, and/or modify call forwarding option profile information (e.g., caller information 125 as previously discussed with respect to FIGS. 1 and 2) stored in repository 180. For example, user 108 can view information retrieved from information server 341 via use of computer system 319-1. Phone connection manager 342 at least initially manages connections between the user 108 and the target user 208.

As previously discussed, the prospective caller 108 provides input 105 specifying different call forwarding options. In one embodiment, the user 108 provides this input 105 to information server 341 over a corresponding client-server connection of network 191. Accordingly, the user 108 can visit a website to access his or her call forwarding option profile information.

The call forwarding options maintained for different users can be implemented on a per-user or per-phone device basis. For example, repository 180 can store a single prospective caller's information profile and forward calls received from any of the user's phone devices 330 (e.g., phone device 330-1 and phone device 330-2) to a corresponding target user. In such an embodiment, upon receipt of a call connection request, the call management system 140 identifies one of the multiple possible phones being used by a caller 108 to make a respective call. The call management system 140 then forwards the call based on call forwarding options for the respective user (e.g., Jim Smith) assigned to use the phone device. Thus, the example user Jim Smith can call on any of a number of phone devices as specified by the user's profile and the call management system 140 forwards the calls via use of a single set of call forwarding options associated with the user.

In another embodiment, the call management system 120 maintains a set of different call forwarding options for each phone device 330 operated by the user 108. Upon receipt of a call connection request, the call management system 140 identifies the phone being used to make a respective call and forwards the call based on a call forwarding options for the respective phone.

In addition to forwarding calls based on an identifier associated with the phone device or the user making the call, the call management system 140 can be configured to include a unique phone number in which the user 108 dials to initially connect to the call management system 140 for purposes of call forwarding. After making an initial connection with the call management system 140, the user 108 may be required to dial a unique identifier value (e.g., a personal identifier value assigned for use by the user 108) identifying the caller 108 who is making the call. Based on the received personal identifier value, the call management system 140 identifies which user is making the call and a corresponding set of call forwarding options in which to handle the incoming call request.

Based on further input (e.g., a phone number or unique identifier value) from the user 108 specifying a target user (e.g., Joseph Cook) that the user 108 wishes to reach via a phone connection, the call management system 140 can initiate call forwarding as previously discussed.

A method for connecting the caller with a respective target user can vary. In one embodiment, the call management system 140 puts the user temporarily on hold after receiving the call request, initiates a connection with the target user 208 based on the call forwarding options, and thereafter bridges the caller on hold with the called party. After making the connection, the call management system 140 may no longer be involved in maintaining the call connection between users.

Communication system 300 and, more particularly, phone connection manager 342 can include the appropriate phone equipment to enable many different types of call connection options. For example, phone connection manager 342 can be configured to receive or initiate both VOIP and/or PSTN type phone calls from one or more users (e.g., user 108) as well as establish or initiate one or more VOIP and/or PSTN type call connections with one or more target users (e.g., target user 208).

In one embodiment, assume that phone device 330-1 is a VOIP phone and phone device 330-2 is a cellular or land-line (e.g., PSTN type) phone device. In accordance with such an embodiment, the user 108 can establish a call connection with the target user 208 through call management system 140 as a VOIP-to-PSTN call connection (e.g., from phone device 330-1 over network 191 to phone connection manager 342 over network 190 to phone device 250-2), a PSTN-to-PSTN call connection (e.g., from phone device 330-2 over network 190 to phone connection manager 342 over network 190 to phone device 250-2), a PSTN-to-VOIP connection (e.g., from phone device 330-2 over network 190 to phone connection manager 342 over network 191 to phone device 250-1), a cellular-to-PSTN, PSTN-to-cellular, etc.

Thus, each of phone devices 330 can connect with phone connection manager 342 that, in turn, establishes any one of connections 380-1, 380-2, or 380-3 to a phone device 250 operated by target user 208. Accordingly, the user 108 (if so equipped with phone devices 330) can reach the target user 208 in a number of different ways.

As previously discussed, user 108 can operate computer system 319-1 (e.g., a client) in order to provide input 105 as previously discussed as well as manage the user's caller information 125-1. For example, to provide input 105, the user 108 can log onto a respective website supported by information server 341. After providing appropriate password and user information, the user 108 is able to access, view, and modify the call forwarding options (e.g., caller information 125).

FIG. 4 is a screenshot of a graphical user interface 420 providing a view of different call forwarding options according to embodiments herein. This example graphical user interface 420 can be presented (on corresponding display screens associated with computer system 319-1) in response to the user 108 typing an appropriate URL (Uniform Resource Locator) to access call forwarding options associated with the user 108. In a similar way, each of multiple respective users can access their respective profile information (e.g., call forwarding options) via communications with information server 341.

As shown, the graphical user interface 420 enables a respective user 108 to view, modify, create, etc. his call forwarding option profile information 480 (e.g., caller information). In one embodiment, the graphical user interface 420 displays the user's name (e.g., Jim Smith) indicating to whom the profile 482 belongs. Additionally, the profile 482 can specify one or more different phone numbers of the phone devices in which to apply the call forwarding options when the user makes a respective call to a person specified in the profile 482.

As previously discussed, the profile 482 (e.g., a more detailed version of caller information 125-1 as discussed above with respect to FIG. 1) can include details associated with each potential target user (as specified by contact names) that the user 108 wishes to call. For example, the profile 482 can indicate contact names (e.g., John Doe, Joseph Cook, etc.) as well as corresponding address information (e.g., street address, zip code, etc.).

For each target user in the contact name column, a row of the profile 482 specifies different sets of phone numbers and/or types of phone devices in which to forward calls made by an owner of the profile 482.

Via input with respect to graphical user interface 420, the user 108 can specify different orderings of call forwarding options that are applied depending on the time of day when a respective call is being made. For example, the user 108 may specify a first set of call forwarding options (for using on weekdays between 9 am and 5 pm) in which the profile 482 indicates a call order of: work phone number, cell phone number, and home phone number for the target user 208. The user 108 may specify a second set of call forwarding options (for using on weekdays between 5-8 pm) in which the profile 482 indicates a call order of: cell phone number, work phone number, home phone number. The user 108 may specify a set of call forwarding options (for using on weekdays after 8 pm) in which the profile 482 indicates a call order of: home phone number, cell phone number, work phone number.

In addition to displaying different call forwarding options, the call forwarding options profile 482 also can provide status information such as whether a corresponding contact (target user 208) happens to be on currently on the phone and unavailable. To implement such an option, the call management system 140 can continuously monitor each of the one or more different phone numbers associated with the different call forwarding options and provide a status of whether the user is bale to receive a new call from the user 108. Thus, in addition to viewing the user's profile 482, the user 108 can access the information server 341 to identify whether a particular person is available or not, for a particular phone device.

Figure 5:
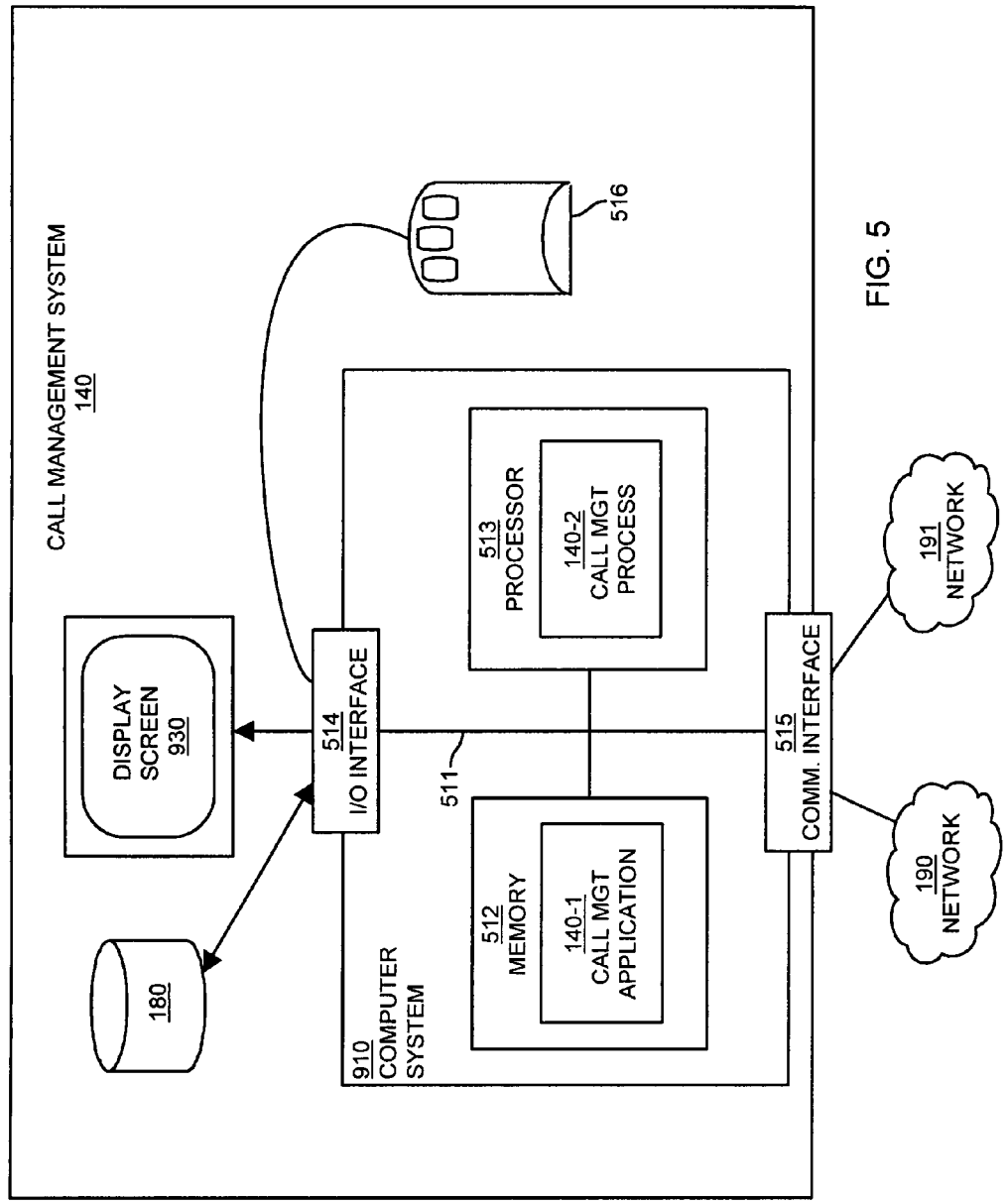
FIG. 5 is an example computer architecture diagram of one or more computer devices associated with the call management system according to embodiments herein.

FIG. 5 is a block diagram of computer resources illustrating an example architecture for implementing (all or part of) call management system 140 according to embodiments herein. As previously discussed, resources such as phone connection manager 341 and information server 342 each or both can be implemented via use of a computer system 910 or computerized device such as a personal computer, phone equipment, internet server equipment, workstation, portable computing device, console, network terminal, processing device, network device, etc.

As shown, computer system 910 of call management system 140 includes an interconnect 511 that couples a memory system 512, a processor 513, I/O interface 514, and a communications interface 515. I/O interface 514 provides connectivity to peripheral devices 516 (if such devices are present) such as a keyboard, mouse, display medium, etc. An administrator associated with call management system 140 can provide input (e.g., program computer system 910, provide updates, etc.) if and when necessary. Communications interface 515 enables call management system 140 to communicate over network 190 (e.g., a phone network) and network 192 (e.g., the Internet) as previously discussed.

As shown, memory system 512 is encoded with call management application 140-1 (e.g., one or more programs or sets of instructions) that support call management according to embodiments herein as discussed above and as discussed further below. All or different portions of call management application 140-1 can be embodied as software code such as data and/or logic instructions (e.g., code stored in the memory or on another computer readable medium such as a disk) that supports processing functionality according to different embodiments described herein. Different functions associated with call management system 140 can execute on different processors or remote equipment.

During operation of one embodiment, processor 513 accesses memory system 512 via the use of interconnect 511 (e.g., a communication link) in order to launch, run, execute, interpret or otherwise perform the logic instructions of the call management application 140-1. Execution of the call management application 140-1 produces processing functionality in call management process 140-2. In other words, the call management process 140-2 represents one or more portions of the call management application 140-1 performing within or upon the processor 513 in the computer system 910.

It should be noted that, in addition to the call management process 140-2 that carries out method operations as discussed herein, other embodiments herein include the call management application 140-1 itself (i.e., the un-executed or non-performing logic instructions and/or data). The call management application 140-1 may be stored on a computer readable medium (e.g., a repository) such as a floppy disk, hard disk or in an optical medium. According to other embodiments, the call management application 140-1 can also be stored in a memory type system such as in firmware, read only memory (ROM), or, as in this example, as executable code within the memory system 512 (e.g., within Random Access Memory or RAM).

In addition to these embodiments, it should also be noted that other embodiments herein include the execution of the call management application 140-1 in processor 513 as the call management process 140-2. Thus, those skilled in the art will understand that the computer system 910 can include other processes and/or software and hardware components, such as an operating system that controls allocation and use of hardware resources.

Functionality supported by call management system 140 will now be discussed via flowcharts in FIGS. 6-10. For purposes of the following discussion, the call management system 140 (or portions thereof) generally performs steps in the following flowcharts. However, the entity (e.g., computer system, combination of computer systems, server, phone equipment, etc.) that executes the operational steps below can vary depending on the configuration. For example, specific sub-systems such as the information server 341, phone connection manager 342, and/or other communication equipment can be configured to perform such operations. Also, note that the steps in the below flowcharts need not always be executed in the order shown or executed by the same processing entity.

Figure 6:
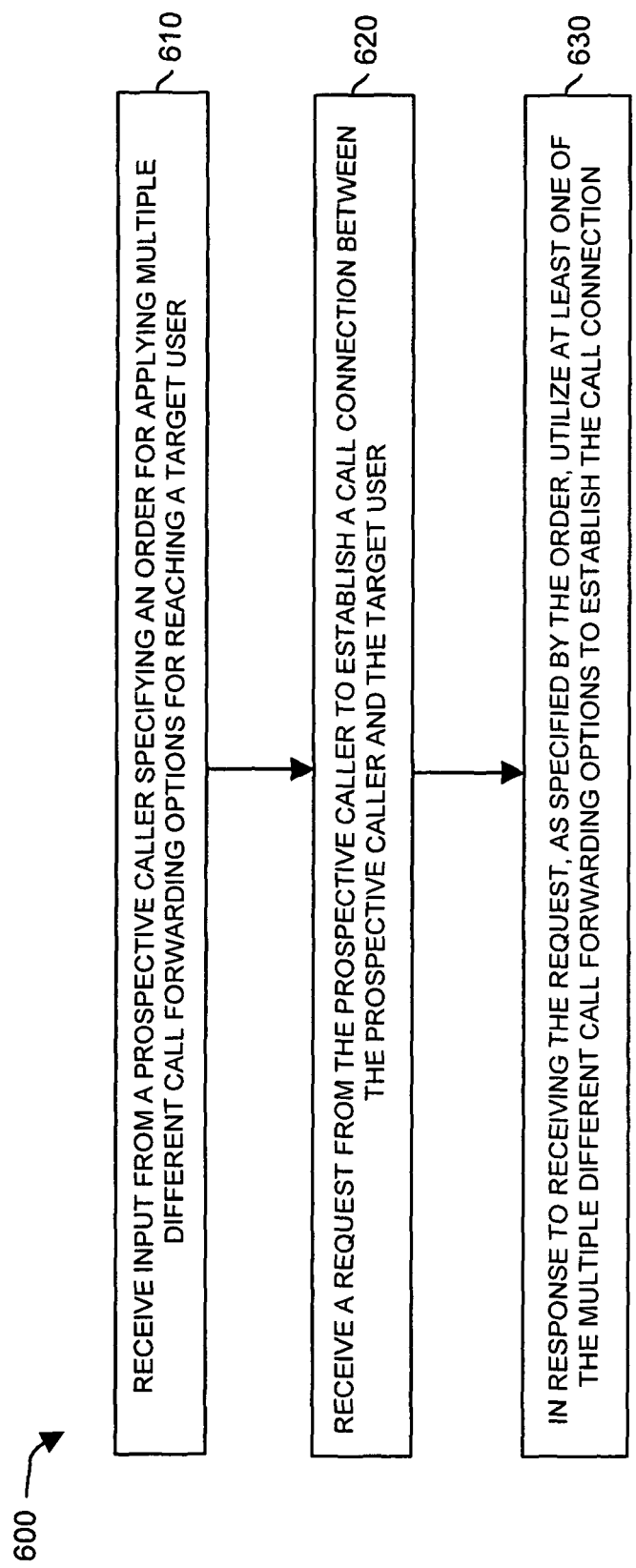
FIGS. 6-10 are example flowcharts illustrating different methods according to embodiments herein.

FIG. 6 is a flowchart 600 illustrating a technique of utilizing call forwarding information according to embodiments herein. Note that flowchart 600 of FIG. 6 and corresponding text below will make reference to and overlap with the matter previously discussed with respect to FIGS. 1-5 above.

In step 610, the call management system 140 receives input 105 from a prospective caller 108 specifying an order for applying multiple different call forwarding options for reaching a target user 208. The order can specify simultaneous calls to each of different phone devices associated with a target user or a sequential order for applying one call forwarding option after another.

In step 620, the call management system 140 receives a request 205 from the prospective caller to establish a call connection between the prospective caller 108 and the target user 208.

In step 630, in response to receiving the request 205, as specified by the previously submitted order, the call management system 140 utilizes at least one of the multiple different call forwarding options to establish the call connection 208.

Figure 7:
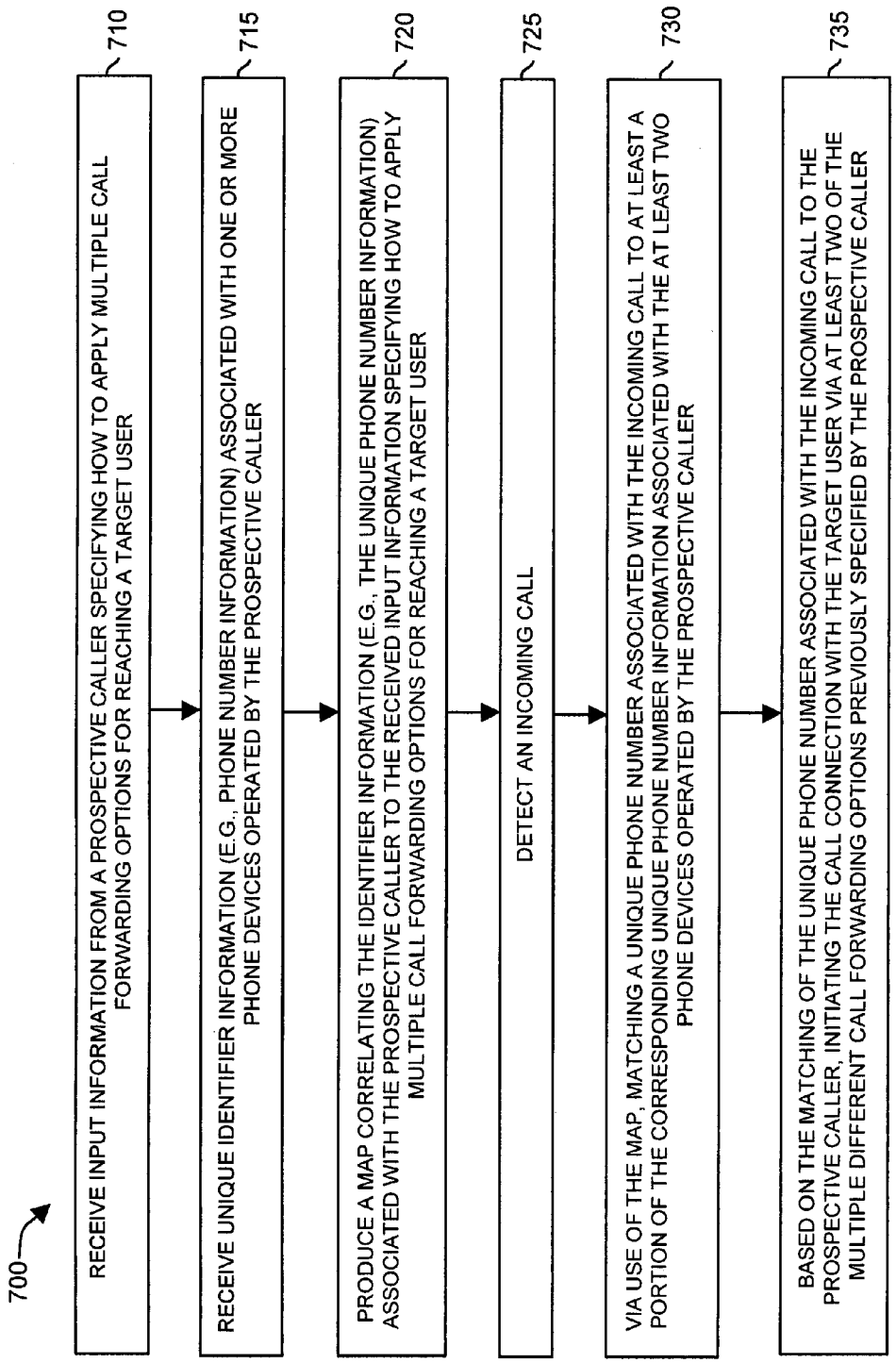

FIG. 7 is a flowchart 700 illustrating a technique of utilizing call forwarding information according to embodiments herein. Note that flowchart 700 of FIG. 7 and corresponding text below will make reference to and overlap with the matter previously discussed above.

In step 710, the call management system 140 receives input 105 (e.g., configuration information) from a prospective caller 108 specifying how to apply multiple call forwarding options for reaching one or more target users.

In step 715, the call management system 140 receives unique identifier information (e.g., phone number information) associated with one or more phone devices operated by the prospective caller 108. In other words, the caller provides respective phone numbers associated with one or more phone devices operated by the prospective caller 108.

In step 720, the call management system 140 produces a map correlating the identifier information (e.g., the submitted unique phone number information) associated with the prospective caller 108 to the received input information specifying how to apply multiple call forwarding options for reaching each of one or more target users.

The call management system 140 can perform the following steps 725 to 735 for each of multiple subsequent calls from the prospective caller to a target user:

In step 725, the call management system 140 detects an incoming call by the caller 108.

In step 730, via use of a map, the call management system 140 matches a unique phone number associated with the incoming call (e.g., a phone device operated by the user 108) to at least a portion of the corresponding unique phone number information associated with the at least two phone devices operated by the prospective caller 108 in the previous steps. In this way, the call management system 140 identifies an originator of the call and can select the appropriate set of call forwarding options in which to forward the call.

In step 735, based on matching of the unique phone number associated with the incoming call to the prospective caller's stored information (e.g., profile), the call management system 140 initiates the call connection with the target user 208 via at least two of the multiple different call forwarding options previously specified by the prospective caller. In other words, the call management system 140 initiates a connection via multiple call forwarding options as specified by the user. The call forwarding options can be implemented in a parallel or serial manner as previously discussed.

Figure 8:
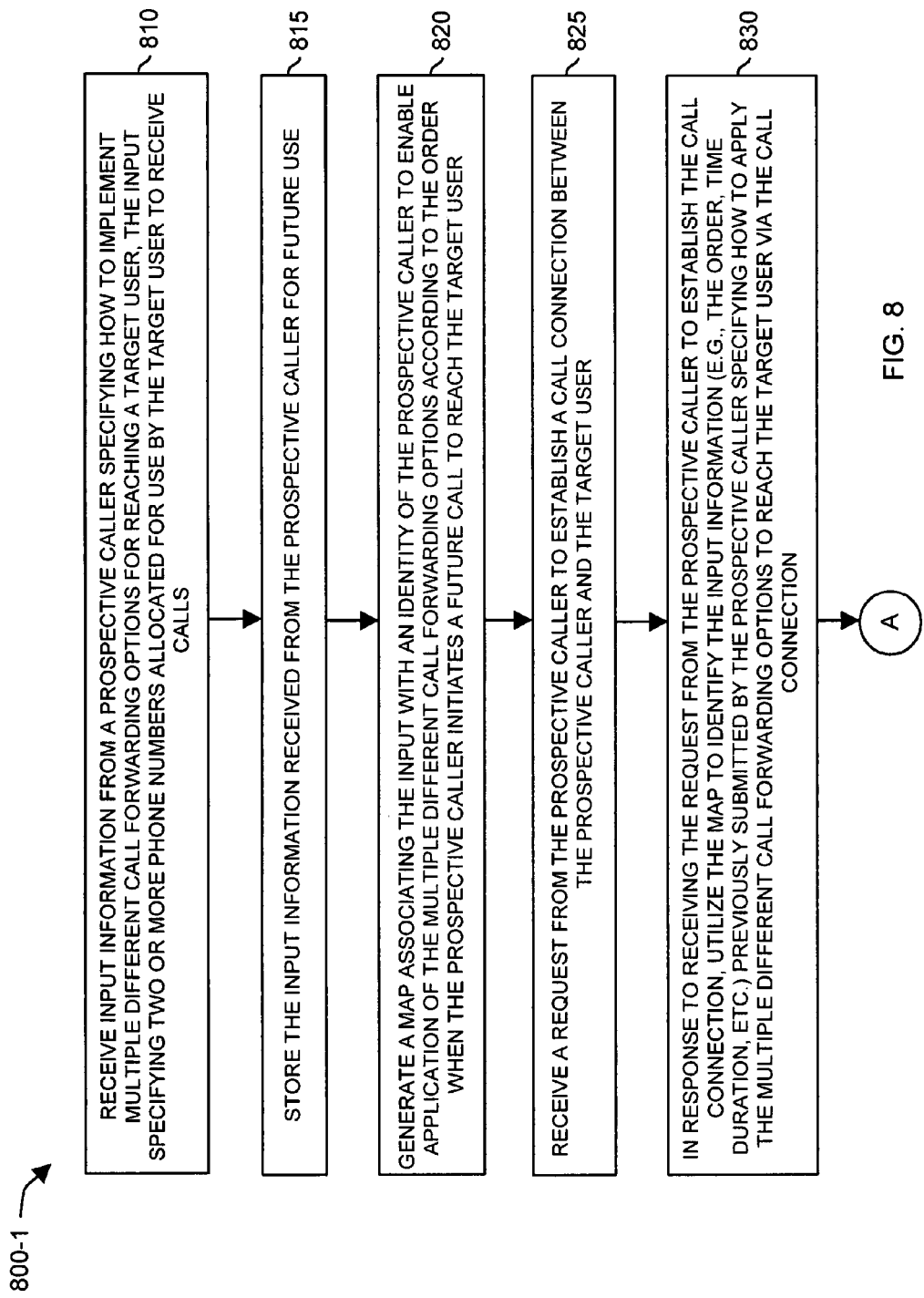
Figure 9:
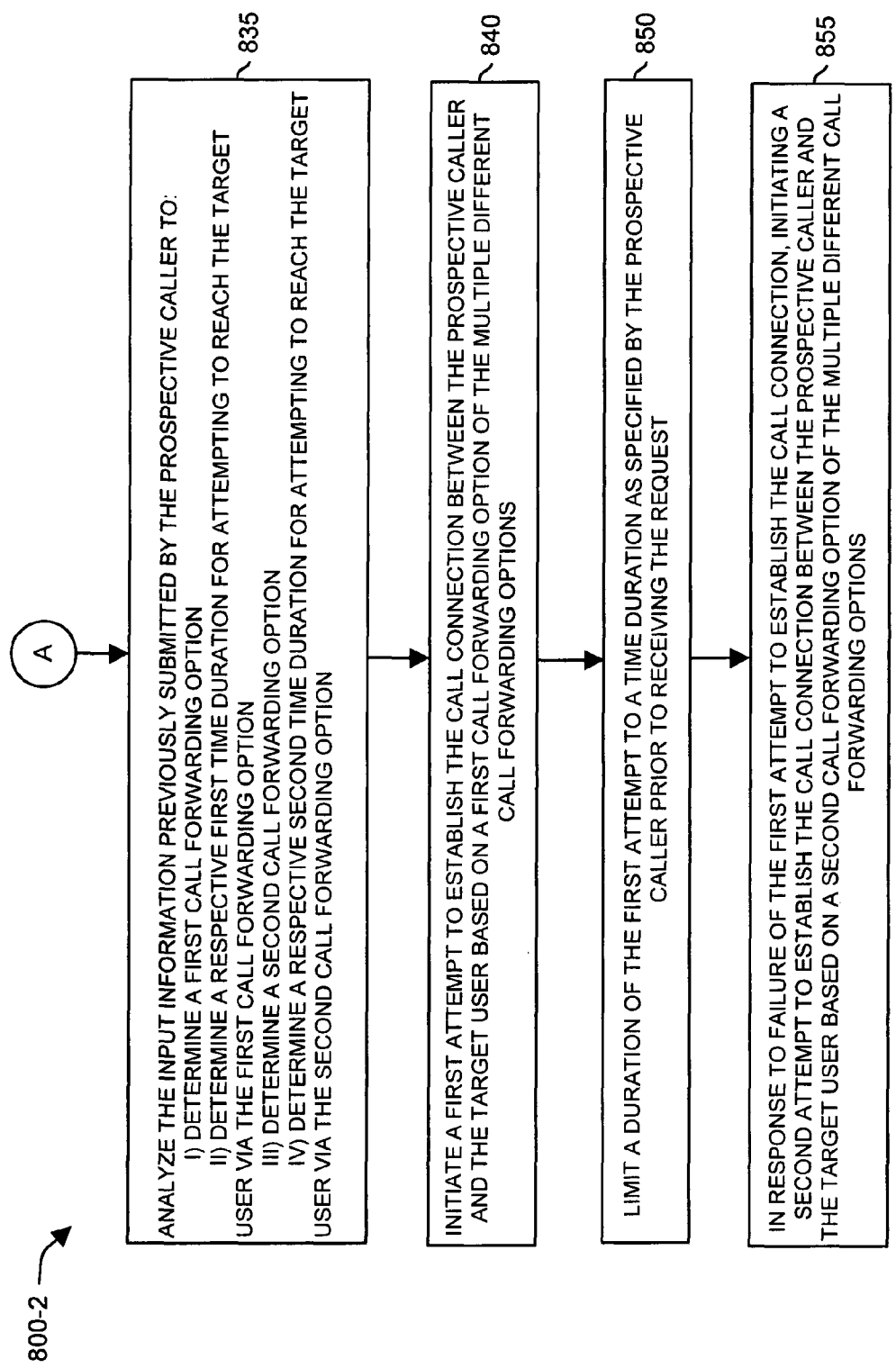

FIGS. 8 and 9 combine to form a flowchart 800 (e.g., flowchart 800-1 and 800-2) illustrating more specific techniques associated with embodiments herein.

In step 810 of flowchart 800-1, the call management system 140 receives input 105 (e.g., configuration information) from a prospective caller 108 specifying how to implement multiple different call forwarding options for reaching a target user 208. In one embodiment, the input 105 specifies two or more phone numbers allocated for use by the target user 208 to receive calls on different phone devices 250. The specified phone numbers can be any type of unique number or address information for reaching a target destination such as PSTN (Public Switched Telephone Network) call destination information, cellular phone call destination information, and/or IP (Internet Protocol) telephony call destination information associated with a respective target user.

In step 815, the call management system 140 stores the input 105 received from the prospective caller 108 in repository 180 for future use.

In step 820, the call management system 140 generates a map associating the input 105 with an identity of the prospective caller 108 to enable application of the multiple different call forwarding options according to a pre-specified order when the prospective caller 108 initiates a future call to a respective target user.

In step 825, the call management system 140 receives a request 205 from the prospective caller 108 to establish a call connection with the target user. The request 205 can be received in the form of an incoming phone call connection request (e.g., a phone call) from at least one of a PSTN phone device, a cellular phone device, and/or VOIP phone device operated by the prospective caller.

In step 830, in response to receiving the request from the prospective caller 108 to establish the call connection, the call management system 140 utilizes the map to identify the input information (e.g., the order, time duration, etc.) previously submitted by the prospective caller 108 specifying how to apply the multiple different call forwarding options to reach the target user via the call connection.

In step 835 of flowchart 800-2 of FIG. 9, the call management system 140 analyzes the input information (e.g., the caller information 125-1) previously submitted by the prospective caller 108 to:

i) determine a first call forwarding option;
ii) determine a respective first time duration for attempting to reach the target user 208 via the first call forwarding option;
iii) determine a second call forwarding option; and
iv) determine a respective second time duration for attempting to reach the target user 208 via the second call forwarding option.

In step 840, the call management system 140 initiates a first attempt to establish the call connection between the prospective caller 108 and the target user 108 based on a first call forwarding option of the multiple different call forwarding options.

In step 850, the call management system 140 limits a duration of the first attempt to a time duration as specified by the prospective caller 108 prior to generation of the request 205. Assume in the present example that the first attempt fails.

In step 855, in response to failure of the first attempt (e.g., dialing of a first phone number) to establish the call connection, the call management system 140 initiates a second attempt (e.g., dialing of a second phone number) to establish the call connection between the prospective caller 108 and the target user 208 based on a second call forwarding option of the multiple different call forwarding options. Similar to the first attempt, the duration associated with the second attempt can also be limited as well.

Figure 10:
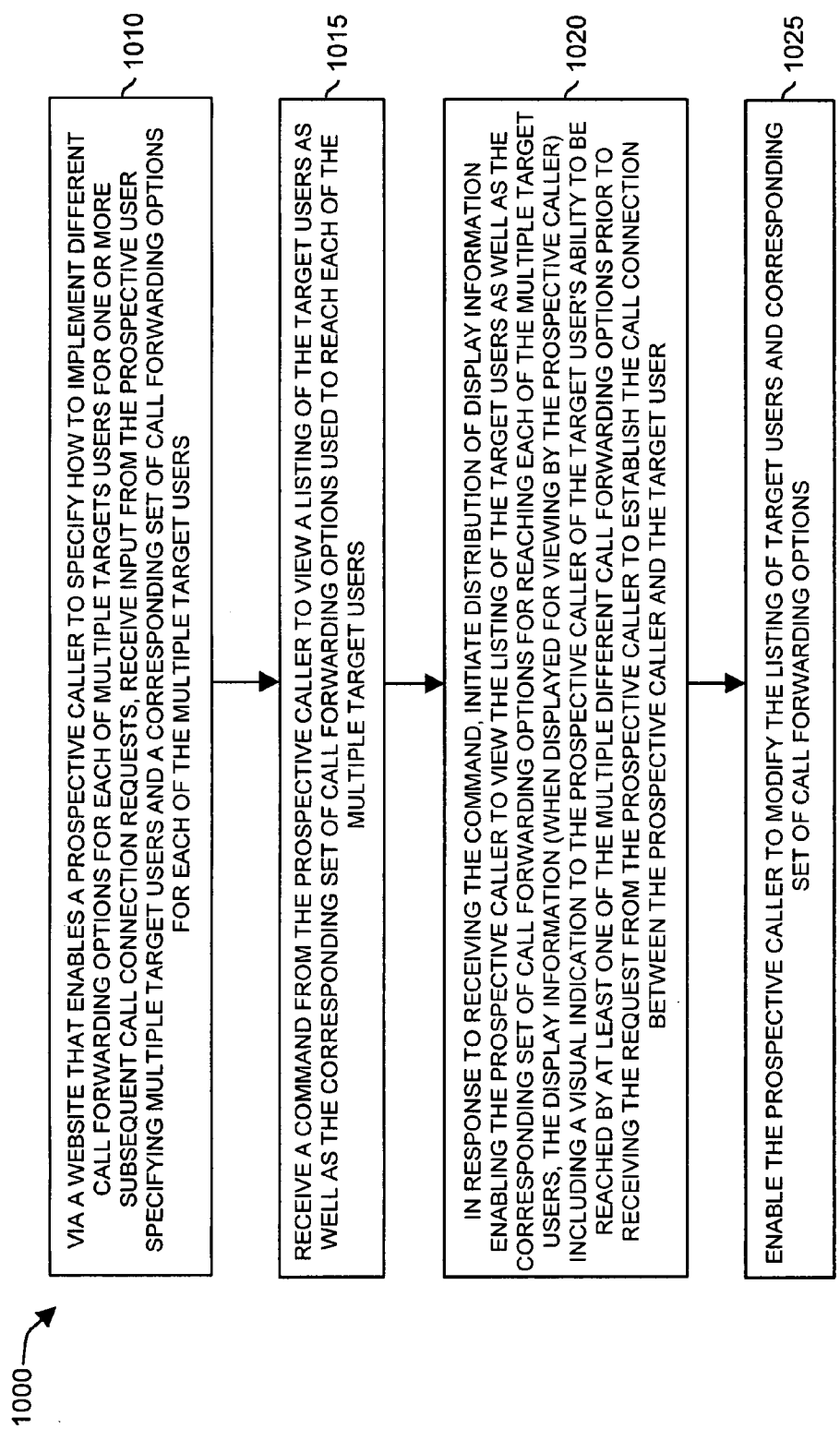

FIG. 10 is a flowchart 1000 illustrating a technique of managing call forwarding information according to embodiments herein. Note that flowchart 1000 of FIG. 10 and corresponding text below will make reference to and overlap with the matter previously discussed above.

In step 1010, via access to a website that enables a prospective caller to specify how to implement different call forwarding options for each of multiple targets users for one or more subsequent call connection requests, the call management system 140 receives input from the prospective user 108 specifying multiple target users and a corresponding set of call forwarding options for each of the multiple target users. Based on the input, the call management system 140 produces caller information 125 for storage in repository 180 as previously discussed.

In step 850, the call management system 140 receives a command from the prospective caller 108 over a network connection to view a listing of the target users as well as the corresponding set of call forwarding options used to reach each of the multiple target users. In other words, the user visits a respective website to view the user's information (e.g., caller information 125-1 or profile 482) as previously discussed above with respect to FIG. 4.

In step 850, in response to receiving the command, the (information server of) call management system 140 initiates distribution of display information (e.g., graphical user interface 420 and corresponding information) enabling the prospective caller 108 to view the listing of the target users as well as the corresponding set of call forwarding options for reaching each of the multiple target users. In one embodiment, the display information (when displayed for viewing by the prospective caller 108 at a computer display screen) can include a visual indication to the prospective caller of each target user's ability to be reached by at least one of the multiple different call forwarding options. In other words, the information server 341 can distribute information indicating the status of one or more phone devices associated with the different target persons that can be called by the prospective caller 108. Distribution and display of such target user call status information enables the prospective caller to avoid making a call to a target user when it is known in advance that the target caller that the caller wants to reach is currently unavailable (e.g., on the phone).

In step 850, the call management system 140 enables the prospective caller 108 viewing his corresponding caller information 125-1 to modify the listing of target users and corresponding set of call forwarding options.

Note again that techniques herein are well suited for call management as described herein. However, it should be noted that general embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
receiving input from a prospective caller specifying an order for applying multiple different call forwarding options for reaching a target user;
receiving a request from the prospective caller to establish a call connection between the prospective caller and the target user; and
in response to receiving the request, as specified by the order, utilizing at least one of the multiple different call forwarding options to establish the call connection;
wherein receiving input from the prospective caller includes: i) prior to receiving the request to establish the call connection, receiving input from the prospective caller specifying first unique contact information for establishing communications with a first communication device operated by the target user; ii) prior to receiving the request to establish the call connection, receiving input from the prospective caller specifying second unique contact information for establishing communications with a second communication device operated by the target user; and
wherein utilizing at least one of the multiple different call forwarding options to establish the call connection includes:
utilizing the first unique contact information provided by the prospective caller to establish the call connection; and
in response to detecting an inability to reach the target user via use of the first unique contact information, utilizing the second unique contact information provided by the prospective caller to establish the call connection.

2. A method as in claim 1, wherein receiving input from the prospective caller includes receiving call destination information including at least two different phone numbers allocated for use by the target user to receive calls, the at least two different phone numbers selected from a group including PSTN (Public Switched Telephone Network) call destination information, cellular phone call destination information, and IP (Internet Protocol) telephony call destination information associated with the target user.

3. A method as in claim 1, wherein receiving the request from the prospective caller includes receiving the request as an incoming phone call connection request from at least one of a PSTN (Public Switched Telephone Network) phone device, a cellular phone device, and a VOIP (Voice Over Internet Protocol) phone device operated by the prospective caller.

4. A method as in claim 1 further comprising: limiting a duration of an attempt to reach the target user via the first unique contact information to a time duration as specified by the prospective caller prior to receiving the request.

5. A method as in claim 1, further comprising:
in response to receiving the request, analyzing the received input to:
i) determine a first call forwarding option as specified by the order;
ii) determine a respective first time duration for attempting to reach the target user via the first call forwarding option;
iii) determine a second call forwarding option as specified by the order; and
iv) determine a respective second time duration for attempting to reach the target user via the second call forwarding option.

6. A method as in claim 1 further comprising:
storing the input received from the prospective caller for future use; and
generating a map associating the input with an identity of the prospective caller to enable application of the multiple different call forwarding options according to the order when the prospective caller initiates a future call to reach the target user.

7. A method as in claim 6 further comprising:
in response to receiving the request from the prospective caller to establish the call connection, utilizing the map to identify the order for applying the multiple different call forwarding options to reach the target user on behalf of the user and establish the call connection.

8. A method as in claim 1, wherein receiving the input from the prospective caller includes receiving the input via a website that enables the prospective caller to specify the multiple different call forwarding options as well as the order for applying the multiple different call forwarding options for a subsequent request to establish the call connection.

9. A method as in claim 8 further comprising:
receiving input from the prospective caller specifying at least one phone device operated by the prospective caller; and
wherein receiving the request from the prospective caller includes detecting that the prospective caller initiates the call connection to the target user via dialing of a phone number associated with the at least one phone device.

10. A method as in claim 1, wherein receiving input from the prospective caller includes receiving input specifying corresponding unique phone number information associated with at least two phone devices operated by the prospective caller, the method further comprising:
for each of multiple subsequent calls from the prospective caller to the target user:
detecting an incoming call from a given phone device;
matching a unique phone number associated with the given phone device to at least a portion of the corresponding unique phone number information associated with the at least two phone devices operated by the prospective caller; and
based on mapping of the unique phone number to the prospective caller, initiating the call connection with the target user via at least two of the multiple different call forwarding options previously specified by the prospective caller.

11. A method as in claim 1 further comprising:
initiating distribution of display information that provides a visual indication to the prospective caller of the target user's ability to be reached by at least one of the multiple different call forwarding options prior to receiving the request from the prospective caller to establish the call connection between the prospective caller and the target user.

12. A method as in claim 1 further comprising:

receiving input from the prospective user specifying multiple target users and a corresponding set of call forwarding options for each of the multiple target users;

receiving a command from the prospective caller to view a listing of the target users as well as the corresponding set of call forwarding options used to reach each of the multiple target users; and in response to receiving the command, initiating distribution of display information enabling the prospective caller to view the listing of the target users as well as the corresponding set of call forwarding options for reaching each of the multiple target users.

13. A method as in claim 1 further comprising:

detecting an incoming call from a given communication device operated by the prospective caller;

identifying that the incoming call is made by the prospective caller;

obtaining call forwarding information provided by the prospective caller prior to the incoming call, the call forwarding information specifying unique contact information in which to communicate with at least two communication devices operated by the target user; and utilizing the unique contact information provided by the prospective caller to contact the target user.

14. A method as in claim 1 further comprising:

prior to receiving the request to establish the call connection, receiving input specifying corresponding unique contact information associated with at least two communication devices operated by the prospective caller;

detecting an incoming call from a given communication device;

matching a unique contact number of the given communication device to at least a portion of the corresponding unique contact information associated with the at least two communication devices operated by the prospective caller; and based on matching, initiating the call connection with the target user via the first unique contact information and the second unique contact information.

15. A method as in claim 1, wherein the order specifies a sequence of using the first unique contact information and the second unique contact information to contact the target user on behalf of the prospective caller; and in accordance with the order specified by the prospective caller prior to receiving the request, attempting to establish the call connection with the target user using the first contact information and the second contact information.

16. A call management system comprising:

at least one processor;

at least one memory unit that stores instructions associated with at least one application executed by the at least one processor; and an interconnection coupling the at least one processor and the at least one memory unit, enabling the call management system to execute the at least one application and perform operations of:

receiving input from a prospective caller specifying an order for applying multiple different call forwarding options to future calls made by the prospective caller attempting to reach a target user;

receiving a request from the prospective caller to establish a call connection between the prospective caller and the target user; and in response to receiving the request, as specified by the order, utilizing at least one of the multiple different call forwarding options to establish the call connection;

wherein receiving input from the prospective caller includes: i) prior to receiving the request to establish the call connection, receiving input from the prospective caller specifying first unique contact information for establishing communications with a first communication device operated by the target user; ii) prior to receiving the request to establish the call connection, receiving input from the prospective caller specifying second unique contact information for establishing communications with a second communication device operated by the target user; and wherein utilizing at least one of the multiple different call forwarding options to establish the call connection includes:

utilizing the first unique contact information provided by the prospective caller to establish the call connection; and in response to detecting an inability to reach the target user via use of the first unique contact information, utilizing the second unique contact information provided by the prospective caller to establish the call connection.

17. A call management system as in claim 16 configured to further support operations of:

in response to receiving the request, analyzing the received input to:

i) determine a first call forwarding option as specified by the order;

ii) determine a respective first time duration for attempting to reach the target user via the first call forwarding option;

iii) determine a second call forwarding option as specified by the order; and iv) determine a respective second time duration for attempting to reach the target user via the second call forwarding option.

18. A call management system as in claim 16 configured to further support operations of:

storing the input received from the prospective caller for future use;

generating a map associating the input with an identity of the prospective caller to enable application of the multiple different call forwarding options according to the order when the prospective caller initiates a future call to reach the target user; and in response to receiving the request from the prospective caller to establish the call connection, utilizing the map to identify the order for applying the multiple different call forwarding options to reach the target user on behalf of the user and establish the call connection.

19. A call management system as in claim 16, wherein receiving the input from the prospective caller includes receiving the input via a website that enables the prospective caller to specify the multiple different call forwarding options as well as the order for applying the multiple different call forwarding options for a subsequent request to establish the call connection.

20. A call management system as in claim 16, wherein receiving input from the prospective caller includes receiving input specifying corresponding unique phone number information associated with at least two phone devices operated by the prospective caller, the call management system further supporting operations of:

for each of multiple subsequent calls from the prospective caller to the target user:
  detecting an incoming call from a given phone device;
  matching a unique phone number associated with the given phone device to at least a portion of the corresponding unique phone number information associated with the at least two phone devices operated by the prospective caller; and
  based on mapping of the unique phone number to the prospective caller, initiating the call connection with the target user via at least two of the multiple different call forwarding options previously specified by the prospective caller.

21. A call management system as in claim 16 configured to further support operations of:
  initiating distribution of display information that provides a visual indication to the prospective caller of the target user's ability to be reached by at least one of the multiple different call forwarding options prior to receiving the request from the prospective caller to establish the call connection between the prospective caller and the target user.

22. A computer program product including a computer-readable hardware storage medium having instructions stored thereon for processing data information, such that the instructions, when carried out by a processing system, enable the processing system to perform the operations of:
  receiving input from a prospective caller specifying an order for applying multiple different call forwarding options for reaching a target user;
  receiving a request from the prospective caller to establish a call connection between the prospective caller and the target user; and
  in response to receiving the request, as specified by the order, utilizing at least one of the multiple different call forwarding options to establish the call connection;
  wherein receiving input from the prospective caller includes: i) prior to receiving the request to establish the call connection, receiving input from the prospective caller specifying first unique contact information for establishing communications with a first communication device operated by the target user; ii) prior to receiving the request to establish the call connection, receiving input from the prospective caller specifying second unique contact information for establishing communications with a second communication device operated by the target user; and
  wherein utilizing at least one of the multiple different call forwarding options to establish the call connection includes:
    utilizing the first unique contact information provided by the prospective caller to establish the call connection; and
  in response to detecting an inability to reach the target user via use of the first unique contact information, utilizing the second unique contact information provided by the prospective caller to establish the call connection.

* * * * *